United States Patent
Lee et al.

(10) Patent No.: US 8,238,918 B2
(45) Date of Patent: *Aug. 7, 2012

(54) HAND OVER METHOD FROM ASYNCHRONOUS MOBILE COMMUNICATION NETWORK TO SYNCHRONOUS MOBILE COMMUNICATION NETWORK

(75) Inventors: Sang-Yun Lee, Seongnam-si (KR);
Jae-Young Ju, Gunpo-si (KR);
Hee-Hyeok Hahm, Seoul (KR);
Young-Ho Joo, Goyang-si (KR);
Bum-Soo Shin, Seoul (KR);
Kyeong-Hee Han, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1328 days.

This patent is subject to a terminal disclaimer.

(21) Appl. No.: 11/911,840

(22) PCT Filed: Apr. 19, 2005

(86) PCT No.: PCT/KR2005/001116
§ 371 (c)(1),
(2), (4) Date: Oct. 18, 2007

(87) PCT Pub. No.: WO2006/112560
PCT Pub. Date: Oct. 26, 2006

(65) Prior Publication Data
US 2009/0129359 A1    May 21, 2009

(51) Int. Cl.
*H04W 36/00* (2009.01)

(52) U.S. Cl. ............... 455/437; 455/436; 455/553.1; 370/310; 370/328; 370/331

(58) Field of Classification Search ............ 455/436, 455/437, 553.1; 370/310, 328, 331
See application file for complete search history.

(56) References Cited

U.S. PATENT DOCUMENTS

| | | | |
|---|---|---|---|
| 6,975,608 B1 * | 12/2005 | Park et al. | 370/332 |
| 2005/0078703 A1 * | 4/2005 | Kim et al. | 370/466 |
| 2007/0275721 A1 * | 11/2007 | Seo | 455/436 |

FOREIGN PATENT DOCUMENTS

| | | | |
|---|---|---|---|
| JP | 2001-186552 A | | 7/2001 |
| JP | 2001-224052 A | | 8/2001 |
| KR | 1020040005145 | * | 1/2005 |
| KR | 2005-77196 A | | 8/2005 |

* cited by examiner

OTHER PUBLICATIONS

International Search Report mailed Jan. 20, 2006 for PCT/KR2005/001116.

*Primary Examiner* — Kamran Afshar
*Assistant Examiner* — Manpreet Matharu
(74) *Attorney, Agent, or Firm* — Lowe Hauptman Ham & Berner, LLP

(57) ABSTRACT

The present invention relates to a method of performing handover from an asynchronous mobile communication network to a synchronous mobile communication network. If the access network of the asynchronous mobile communication network (100) requests handover to an MSC (104) of the asynchronous mobile communication network, the MSC requests/receives subscriber information of the mobile communication terminal from a dual-stack HLR (300), and transmits a handover request message to the synchronous mobile communication network (200). The MSC (203) of the synchronous mobile communication network assigns a forward channel to the mobile communication terminal. The asynchronous mobile communication network (100) transmits a handover instruction message to the asynchronous RF device of the mobile communication terminal. Accordingly, the mobile communication terminal sets up a synchronous RF device, connects to the synchronous mobile communication network through reverse channel assignment and synchronization. The mobile communication terminal transmits a handover completion message to the synchronous mobile communication network.

35 Claims, 17 Drawing Sheets

FIG. 11

| Relocation Required | | | | | |
|---|---|---|---|---|---|
| Parameter name | Type | Range | Reference | Content and purpose | Assigned Criticality |
| Message Type | M | | | Relocation Preparation | reject |
| Relocation Type | M | | | UE involved/not involved In case of Relocation related to UE, UTRAN must of notify UE of Relocation | reject |
| Cause | M | | | Cause of Relocation | ignore |
| Source ID | M | | | Use Global RNC-ID of Source RNC as Source RNC-ID | ignore |
| Target ID | M | | | Include RNC ID and LAI in target RNC ID | reject |
| Source RNC To Target RNC Transparent Container | C— ifUMTS target | | | Information transmitted by Source RNC to Target RNC, which includes preset RAB information and radio section related information | reject |

FIG. 12

| Information Element(BS →MSC) | Type | Ele. ID | USAGE |
|---|---|---|---|
| Cause | M | 04H | OE H : Interference<br>OF H : Better cell |
| Cell Identifier List(Target) | M | 1AH | |
| Classmark Information Type2 | O/R | 12H | |
| Transcode Mode | | 36H | |
| IS-95 Channel Identity | O/C | 09H | |
| Mobile Identity(ESN) | O/R | 0DH | |
| Downlink Radio Environment | O/C | 29H | |
| Service Option | O/R | 03H | |
| CDMA serving One Way Delay | O/C | 0CH | |
| IS-95 MS Measured Channel Identity | O/R | 64H | |
| IS-2000 Channel Identity | O/C | 22H | |
| Quality of Service Parameters | O/C | 07H | Only for Packet Data Call |
| IS-2000 Movile Capabilities | O/R | 11H | |
| IS-2000 Service configuration Record | O/C | 0EH | |
| PDSN IP Address | O/C | 14H | Used In Inter PCF Hard H/O |
| Protocol Type | O/C | 18H | Used In Inter PCF Hard H/O |

FIG. 13

| CallDataRequest | Timer=CDRTT | Grade=1 | Code =00010101(H'15) | |
|---|---|---|---|---|
| Request Parameter | | Type | Reference | Notes |
| BillingID | | M | 6.5.2.16 | |
| Digits(Dialed) | | M | 6.5.2.58 | |
| MSCID(Originating) | | M | 6.5.2.82 | |
| SystemMyTypeCode(Originating) | | M | 6.5.2.147 | |
| UsageIndicator | | M | 6.5.2.164 | |
| PC_SSN (MSC-H OR MSC-G) | | O | 6.5.2.93 | |
| Transmission Result Parameter | | Type | Reference | Notes |
| ElectronicSerialNumber | | M | 6.5.2.63 | |
| MobileIdentificationNumber | | M | 6.5.2.81 | |
| MSCID(Serving) | | M | 6.5.2.82 | |
| SystemMyTypeCode(Serving) | | M | 6.5.2.147 | |
| PC_SSN(Serving MSC) | | O | 6.5.2.93 | |

FIG. 14

| Parameter name | Request | Indication | Response | Confirm |
|---|---|---|---|---|
| Invoke Id | M | M(=) | M(=) | M(=) |
| MSISDN | M | M(=) | | |
| IMSI | | | C | C(=) |
| MIN | | | C | C(=) |
| ESN | | | C | C(=) |
| User error | | | C | C(=) |
| Provider error | | | | O |

FIG. 15

| FacilitiesDirective2 | Timer=HOT | Grade=1 | Code =00100100(H'24) | |
|---|---|---|---|---|
| Request Parameter | | Type | Reference | Notes |
| BillingID | | M | 6.5.2.16 | |
| ElectronicSerialNumber | | M | 6.5.2.63 | |
| InterMSCCircuitID | | M | 6.5.2.72 | |
| InterSwitchCount | | M | 6.5.2.73 | |
| MobileIdentificationNumber | | M | 6.5.2.81 | |
| ServingCellID | | M | 6.5.2.117 | |
| CDMACallMode | | O | 6.5.2.29 | |
| CDMAChannelData (Serving) | | O | 6.5.2.30 | |
| CDMAMobileProtocolRevision | | O | 6.5.2.34 | |
| CDMAPrivateLongCodeMask | | O | 6.5.2.36 | |
| CDMAServingOneWayDelay | | O | 6.5.2.38 | |
| CDMAStationClassMark | | O | 6.5.2.41 | |
| CDMATargetMAHOList | | O | 6.5.2.43 | |
| CDMATargetMeasurementList | | O | 6.5.2.45 | |
| ConfidentialityModes (Desired) | | O | 6.5.2.50 | |
| HandoffReason | | O | 6.5.2.70 | |
| HandoffState | | O | 6.5.2.71 | |
| MSLocation | | O | 6.5.2.84 | |
| SignalingMessageEncryptionKey | | O | 6.5.2.120 | |
| VoicePrivacyMask | | O | 6.5.2.167 | |
| Transmission Result Parameter | | Type | Reference | Notes |
| CDMAChannelData (Target) | | O | 6.5.2.30 | |
| CDMACodeChannelList | | O | 6.5.2.33 | |
| CDMASearchWindow | | O | 6.5.2.37 | |
| ConfidentialityModes (Actual) | | O | 6.5.2.50 | |

FIG. 16

| Parameter name | Type | Range | Reference | Content and purpose | Assigned Criticality |
|---|---|---|---|---|---|
| Message Type | M | | | Relocation Preparation | reject |
| Target RNC To Source RNC Transparent Container | O | | | Transmit RRC Container, Received from Target RNC Through Relocation Request ack Message, to Source RNC | reject |
| L3 Information | O | | | | ignore |
| RABs To Be Released List | O | | | Include RAB List To Be Released | ignore |
| > RABs To Be Released Item IEs | | 1 to 7 | | | ignore |
| > RAB ID | M | | | The Same RAB ID Must Exist In One Group | |
| Criticality Diagnostics | O | | | Error Information In Relocation Request Message | ignore |

FIG. 17

| FacilitiesRelease | Timer=CTT | Grade =1 | Code =00000101(H'05) | |
|---|---|---|---|---|
| Request Parameter | | Type | Reference | Notes |
| InterMSCCircuitID | | M | 6.5.2.72 | |
| ReleaseReason | | M | 6.5.2.111 | |
| BillingID | | O | 6.5.2.16 | |
| MobileIdentificationNumber | | O | 6.5.2.81 | |
| Transmission Result Parameter | | Type | Reference | Notes |
| BillingID | | O | 6.5.2.30 | |

HAND OVER METHOD FROM ASYNCHRONOUS MOBILE COMMUNICATION NETWORK TO SYNCHRONOUS MOBILE COMMUNICATION NETWORK

CROSS REFERENCE TO RELATED APPLICATION

This application is the National Phase application of International Application No. PCT/KR2005/001116, filed Apr. 19, 2005, which designates the United States and was published in English. This application, in its entirety, is incorporated herein by reference.

TECHNICAL FIELD

The present invention relates, in general, to handover and, more particularly, to a method of performing handover from an asynchronous mobile communication network to a synchronous mobile communication network, which smoothly performs handover from the asynchronous mobile communication network to the synchronous mobile communication network, and performs handover during alerting, and while waiting for call answering.

BACKGROUND ART

Currently, mobile communication service technology can be classified into an asynchronous service environment, used in Europe, and a synchronous service environment, used in North America. Further, as a standard of new mobile communication technology for transmitting packets at high speed, the International Mobile Telecommunications (IMT)-2000 service has been developed around North America and Europe.

The synchronous IMT-2000 service (synchronous mobile communication network) has been developed into Code Division Multiple Access (CDMA) 2000 1x or CDMA 2000 1x Evolution Data Only (EV-DO), and the asynchronous IMT-2000 service (asynchronous mobile communication network) has been developed into Wideband CDMA (WCDMA) Universal Mobile Telecommunications System (UMTS) service. In such a service environment, roaming between synchronous and asynchronous networks has arisen as the biggest outstanding problem. Accordingly, a terminal supporting dual band/dual mode to enable stable roaming between synchronous and asynchronous mobile communication networks is required.

The asynchronous mobile communication network is being constructed in areas having a large number of service requests, so that a synchronous mobile communication network has developed such that the service area thereof includes the service area of the asynchronous mobile communication network. In this environment, when a user moves between an asynchronous mobile communication system and a synchronous mobile communication system, handover between systems is required to provide continuous service. Handover methods for the case where an originating terminal moves from the region of the asynchronous mobile communication network to the region of the synchronous mobile communication network during call origination, and the case where a called terminal moves from the region of the asynchronous mobile communication network to the region of the synchronous mobile communication network during alerting, are required.

DISCLOSURE OF THE INVENTION

Accordingly, the present invention has been made keeping in mind the above problems occurring in the prior art, and an object of the present invention is to provide a method of performing handover from an asynchronous mobile communication network to a synchronous mobile communication network, which smoothly performs handover when a mobile communication terminal supporting dual band/dual mode moves from the asynchronous mobile communication network to the synchronous mobile communication network, and which smoothly performs alerting and call origination when the mobile communication terminal moves from the asynchronous mobile communication network to the synchronous mobile communication network during alerting or call origination.

BRIEF DESCRIPTION OF THE DRAWINGS

FIGS. 11 to 17 are diagrams showing parameters included in messages for handover according to the present invention.

BEST MODE FOR CARRYING OUT THE INVENTION

Figure 1:
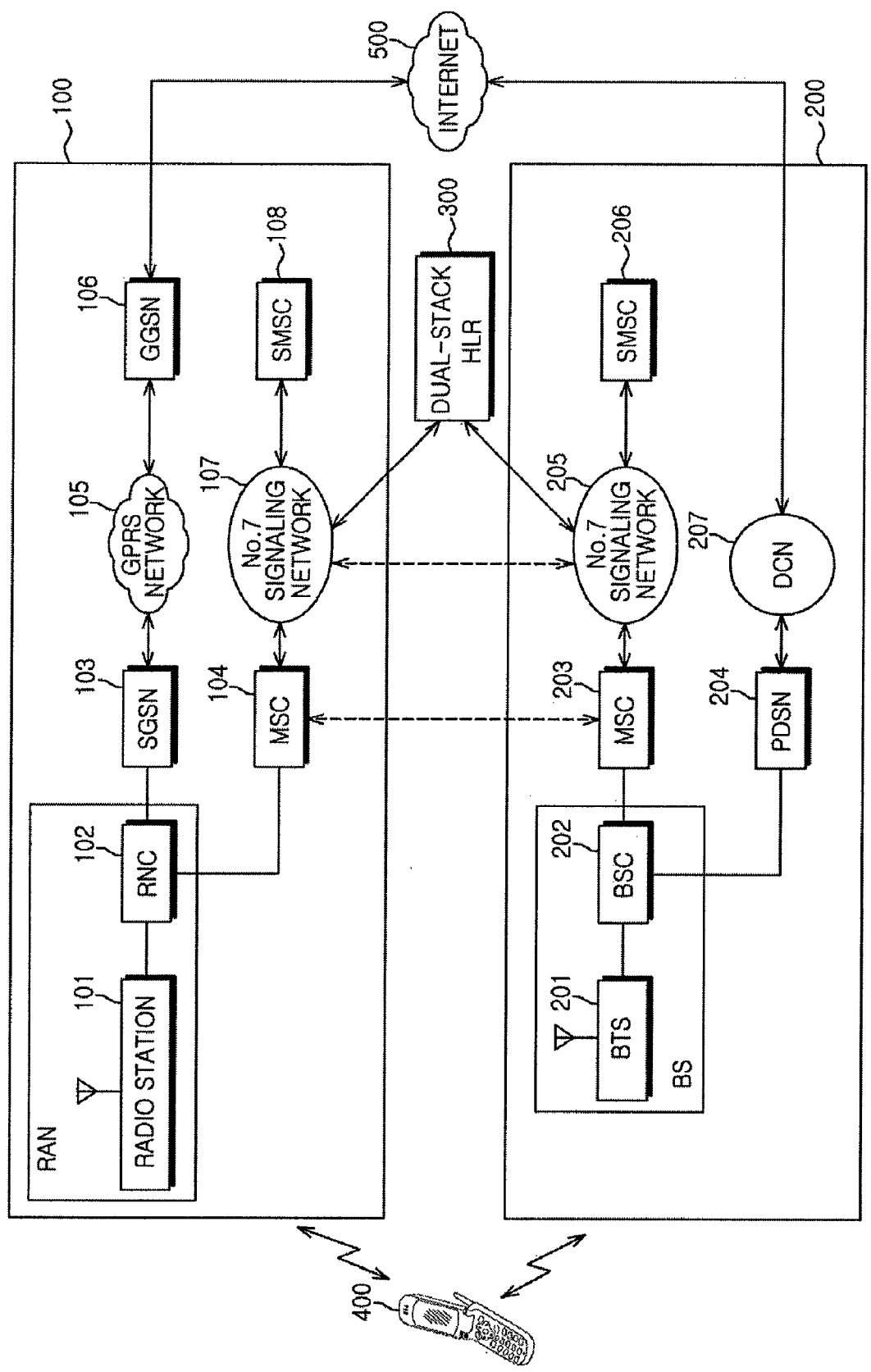
FIG. 1 is a block diagram showing the connection between a mobile communication terminal and a mobile communication network according to the present invention.

In order to accomplish the above object, the present invention provides a method of performing handover from an asynchronous mobile communication network to a synchronous mobile communication network in which the asynchronous mobile communication network and the synchronous mobile communication network coexist for a dual-band/dual mode mobile communication terminal, and which includes a dual-stack Home Location Register (HLR) required to manage information about subscribers to the asynchronous and synchronous mobile communication networks, the mobile communication terminal including an asynchronous Radio Frequency (RF) device for performing asynchronous communication with the asynchronous mobile communication network a synchronous RF device for performing synchronous communication with the synchronous mobile communication network and a common module for controlling wireless communicating with the synchronous/asynchronous mobile communication networks through the synchronous and asynchronous RF devices, the method comprising a first step of an access network of the asynchronous mobile communication network requesting handover to a Mobile Switching Center (MSC) of the asynchronous mobile communication network in response to a handover request from the mobile communication terminal, a second step of the MSC of the asynchronous mobile communication network determining whether the requested handover is handover to the synchronous mobile communication network in response to the handover request, requesting subscriber information of the mobile communication terminal from the dual-stack HLR, and receiving the subscriber information from the dual-stack HLR if it is determined that the requested handover is handover to the synchronous mobile communication network, a third step of transmitting a handover request message to the synchronous mobile communication network, based on the subscriber information of the mobile communication terminal received at the second step, a fourth step of an MSC of the synchronous mobile communication network assigning a forward channel to the mobile communication terminal, based on the subscriber information, a fifth step of, if the MSC of the synchronous mobile communication network transmits a response message to the asynchronous mobile communication network after channel assignment has been performed at the fourth step, the asynchronous mobile communication network transmitting a handover instruction message to the asynchronous RF device of the mobile communication terminal, a sixth step of the mobile communication terminal setting up the synchronous RF device in response to the handover instruction message, connecting to the synchronous mobile communication network through assignment of a reverse channel and achievement of synchronization, and transmitting a handover completion message to the synchronous mobile communication network, a seventh step of the synchronous mobile communication network transmitting a handover completion message to the asynchronous mobile communication network in response to the handover completion message at the sixth step, and an eighth step of the MSC of the asynchronous mobile communication network transmitting a path release command to the access network in response to the handover completion message from the synchronous mobile communication network, and receiving a response from the access network, thus releasing the path between the asynchronous mobile communication network and the asynchronous RF device of the mobile communication terminal.

Further, in order to accomplish the above object, the present invention provides a method of performing handover from an asynchronous mobile communication network to a synchronous mobile communication network during alerting, in which the asynchronous mobile communication network and the synchronous mobile communication network coexist for a dual-band/dual mode mobile communication terminal, and which includes a dual-stack Home Location Register (HLR) required to manage information about subscribers to the asynchronous and synchronous mobile communication networks, the mobile communication terminal including an asynchronous Radio Frequency (RF) device for performing asynchronous communication with the asynchronous mobile communication network, a synchronous RF device for performing synchronous communication with the synchronous mobile communication network, and a common module for controlling wireless communicating with the synchronous/asynchronous mobile communication networks through the synchronous and asynchronous RF devices, the method comprising a first step of the asynchronous mobile communication network requesting/receiving information about the mobile communication terminal, which is a called terminal located in a region of the asynchronous mobile communication network, from the dual-stack HLR, if the called terminal enters the synchronous mobile communication network during alerting, a second step of requesting handover to the synchronous mobile communication network in response to information about the called terminal received at the first step, a third step of the synchronous mobile communication network assigning a forward channel to the called terminal in response to information at the second step, a fourth step of, if the synchronous mobile communication network transmits a response message to the asynchronous mobile communication network after channel assignment has been performed at the third step, the asynchronous mobile communication network transmitting a handover instruction message to the asynchronous RF device of the called terminal, a fifth step of the called terminal setting up the synchronous RF device in response to the handover instruction message, connecting to the synchronous mobile communication network through assignment of a reverse channel and achievement of synchronization, and maintaining the alerting, a sixth step of releasing the path between the asynchronous mobile communication network and the asynchronous RF device of the called terminal in response to a handover completion message received from the synchronous mobile communication network after the connection has been performed, and a seventh step of, if the called terminal responds to the alerting, the synchronous mobile communication network connecting the call.

Further, in order to accomplish the above object, the present invention provides a method of performing handover from an asynchronous mobile communication network to a synchronous mobile communication network while waiting for call answering as a handover method in a mobile communication network, in which the asynchronous mobile communication network and the synchronous mobile communication network coexist for a dual-band/dual mode mobile communication terminal, and which includes a dual-stack Home Location Register (HLR) required to manage information about subscribers to the asynchronous and synchronous mobile communication networks, the mobile communication terminal including an asynchronous Radio Frequency (RF) device for performing asynchronous communication with the asynchronous mobile communication network a synchronous RF device for performing synchronous communication with the synchronous mobile communication network, and a common module for controlling wireless communicating with the synchronous/asynchronous mobile communication networks through the synchronous and asynchronous RF devices, the method comprising a first step of an access network of the asynchronous mobile communication network requesting handover to a core network as the mobile communication terminal, which is an originating terminal located in a region of the asynchronous mobile communication network, enters the synchronous mobile communication network while waiting for call answering, a second step of the core network of the asynchronous mobile communication network transmitting a message, requesting information about a subscriber to the synchronous mobile communication network of the originating terminal, for which handover is to be performed, to the dual-stack HLR in response to the handover request and receiving a response from the dual-stack HLR, a third step of the MSC of the asynchronous mobile communication network generating a handover request message, based on the information of the originating terminal received at the second step, and requesting handover to the synchronous mobile communication network, a fourth step of the synchronous mobile communication network assigning a forward channel to the originating terminal based on the information at the third step, a fifth step of, if the synchronous mobile communication network transmits a response message to the asynchronous mobile communication network after channel assignment has been performed at the fourth step, the asynchronous mobile communication network transmitting a handover instruction message to the asynchronous RF device of the originating terminal, a sixth step of the originating terminal, which is waiting for call answering, setting up the synchronous RF device in response to the handover request message, connecting to the synchronous mobile communication network through assignment of a reverse channel and achievement of synchronization, and continuing to wait for call answering, and a seventh step of releasing the path between the asynchronous mobile communication network and the asynchronous RF device of the originating terminal that is waiting for call answering, in response to a handover completion message received from the synchronous mobile communication network after the connection has been performed, thus completing handover of the originating terminal.

Hereinafter, embodiments of the present invention will be described in detail with reference to the attached drawings.

FIG. 1 is a block diagram showing the construction of synchronous and asynchronous mobile communication networks according to the present invention.

Referring to FIG. 1, the asynchronous mobile communication network (WCDMA network) 100 includes a radio station 101 for wirelessly communicating with a mobile communication terminal 400, a radio network controller (hereinafter referred to as an "RNC") 102 for controlling the radio station 101, a serving General Packet Radio Service (GPRS) service node (hereinafter referred to as an "SGSN") 103 connected to the RNC 102 to manage the mobility of the mobile communication terminal 400, and a Gateway GPRS Supporting Node (hereinafter referred to as a "GGSN") 106, which is a relay device for controlling a packet service and transferring packet data through a GPRS network 105.

Further, a mobile switching center (hereinafter referred to as an "MSC") 104 for performing call switching is connected to the RNC 102, and the MSC 104 is connected to a No. 7 signaling network 107 for signal switching. The No. 7 signaling network 107 is connected to a short message service center (hereinafter referred to as an "SMSC") 108 for serving short message services, and to a dual-stack home location register (hereinafter referred to as a "dual-stack HLR") 300 for managing information about the location of a subscriber.

Meanwhile, the synchronous mobile communication (CDMA 2000 network) 200 includes a base transceiver station (hereinafter referred to as a "BTS") 201 for wirelessly communicating with the mobile communication terminal 400, a base station controller (hereinafter referred to as a "BSC") 202 for controlling the BTS 201, a packet data service node (hereinafter referred to as a "PDSN") 204 connected to the BSC 202 to serve packet data service, a data core network (hereinafter referred to as a "DCN") 209 connected to the PDSN 204 to provide Internet access service, and a mobile switching center (hereinafter referred to as an "MSC") 203 connected to the BSC 202 to perform call switching.

The MSC 203 is connected to a No. 7 signaling network 205 for signal switching. The No. 7 signaling network 205 is connected to an SMSC 206 for providing short message services, and the dual-stack HLR 300 for managing information about the location of a subscriber.

The MSCs 104 and 203 of the asynchronous mobile communication network 100 and the synchronous mobile communication network 200 are connected to each other, and the No. 7 signaling networks 107 and 205 thereof are connected to each other, thus enabling transmitting or receiving of information required for handover of the mobile communication terminal 400.

Further, in this embodiment, the dual-stack HLR 300, connected in common both to the synchronous mobile communication network 200 and to the asynchronous mobile communication network 100, manages information about subscribers and the location information of the subscribers to the asynchronous mobile communication network 100 and the synchronous mobile communication network 200. The dual-stack HLR 300 is shared by the asynchronous and synchronous mobile communication networks 100 and 200.

Figure 2:
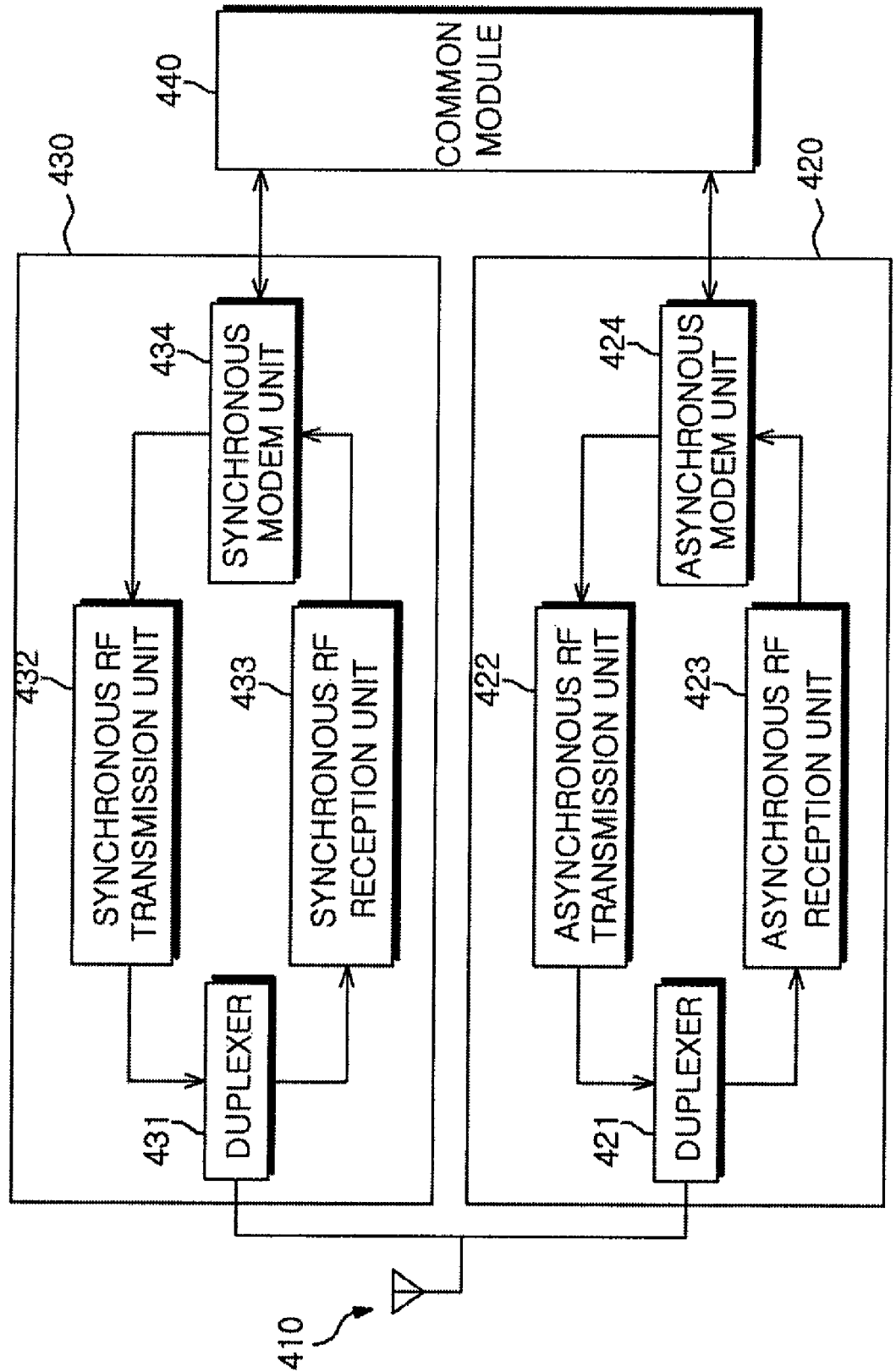
FIG. 2 is a block diagram showing the construction of a mobile communication terminal according to the present invention.

FIG. 2 is a block diagram showing the construction of a dual band/dual mode mobile communication terminal according to the present invention.

Referring to FIG. 2, the dual band/dual mode mobile communication terminal 400 according to the present invention has separate protocol stacks to support both synchronous and asynchronous mobile communication.

The mobile communication terminal 400 according to the present invention includes an antenna 410 for transmitting/receiving radio waves to/from both the synchronous mobile communication network 200 and the asynchronous mobile communication network 100, a synchronous Radio Frequency (RF) device 430 for performing synchronous communication, an asynchronous RF device 420 for performing asynchronous communication, and a common module 440 for providing common resources at the time of performing synchronous and asynchronous communication.

The synchronous RF device 430 includes a synchronous RF transmission unit 432 for RF transmission, a synchronous RF reception unit 433 for RF reception, and a synchronous modem unit 434. One end of each of the synchronous RF transmission unit 432 and the synchronous RF reception unit 433 is connected to the antenna 410 through a duplexer 431, and the other end thereof is connected to the synchronous modem unit 434.

Further, the asynchronous RF device 420 includes an asynchronous RF transmission unit 422 for RF transmission, an asynchronous RF reception unit 423 for RF reception, and an asynchronous modem unit 424. One end of each of the asynchronous RF transmission unit 422 and the asynchronous RF reception unit 423 is connected to the antenna 410 through a duplexer 421, and the other end thereof is connected to the asynchronous modem unit 424.

The common module 440 includes an application processor that functions as a central processing unit for controlling the synchronous modem unit 434 and the asynchronous modem unit 424, and performs a multimedia function, provides memory, an input/output unit, other application processing units, etc. A detailed construction of the common module 440 is described below.

Figure 3:
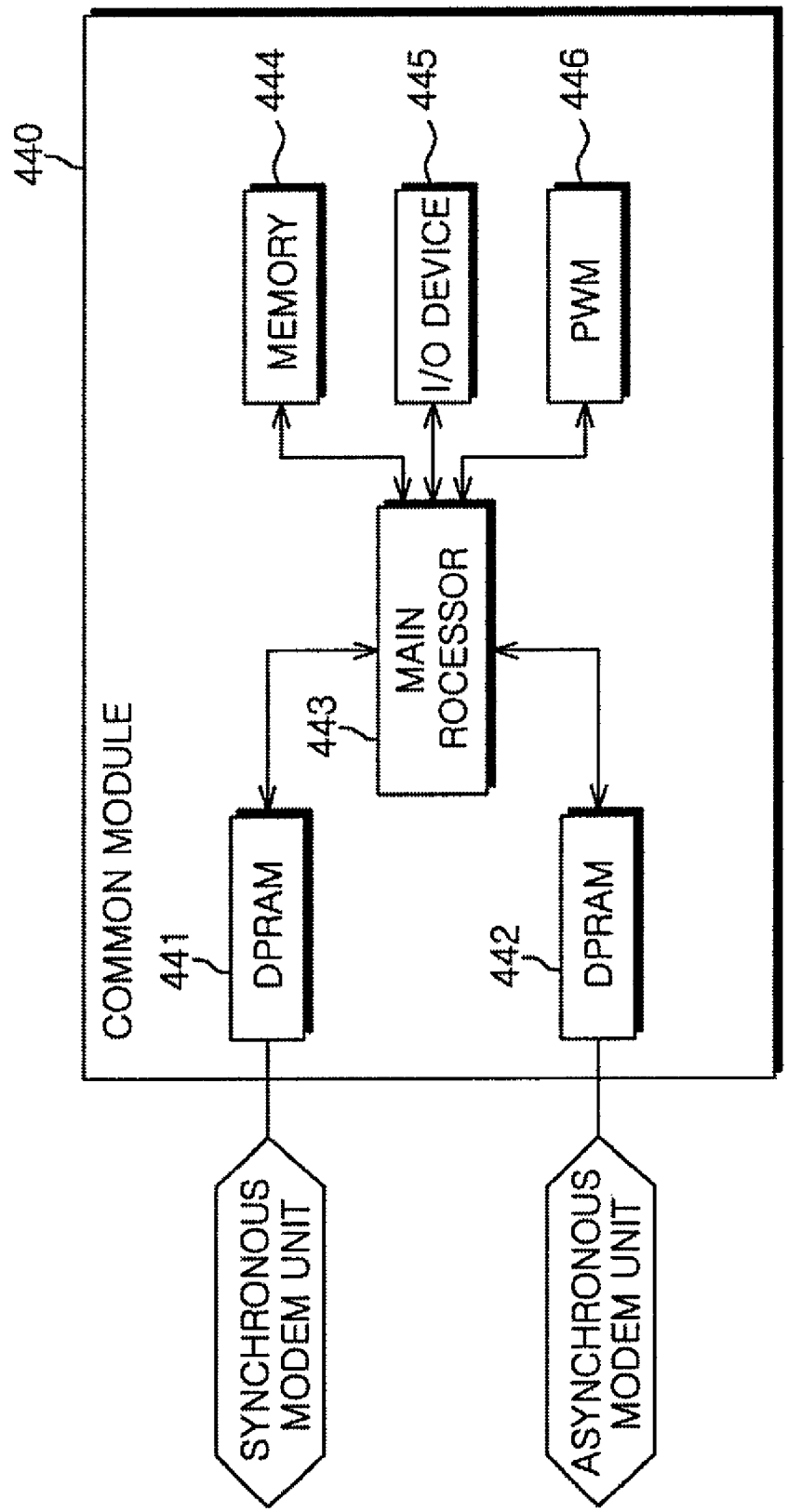
FIG. 3 is a block diagram showing the construction of a mobile communication terminal according to the present invention.

FIG. 3 is a block diagram showing the common module of the mobile communication terminal according to the present invention.

Referring to FIG. 3, the common module 440 of the mobile communication terminal according to the present invention includes a plurality of dual port Random Access Memory (RAM) devices (hereinafter referred to as "DPRAMs") 441 and 442 that are respectively connected to the modem units 434 and 424 of the synchronous RF device 430 and the asynchronous RF device 420, and a main processor 443 that is connected to the DPRAMs 441 and 442 and is adapted to perform overall control for the synchronous and asynchronous communication of the mobile communication terminal 400 and to execute applications. The main processor 443 is connected to memory 444 for storing data, an I/O unit 445 for interfacing with peripherals, and a power control module (hereinafter referred to as a "PWM") 446 for performing power control.

In the common module 440 having the above construction, software for a user interface, supplementary service, mobility management, connection/session control, resource control and protocol processing is installed, thus allowing a user to use various types of application services, performing handover, and performing protocol conversion corresponding to each mobile communication system.

Next, a handover method according to the present invention is described below with reference to the conceptual views of FIGS. 4 to 6.

Figure 4:
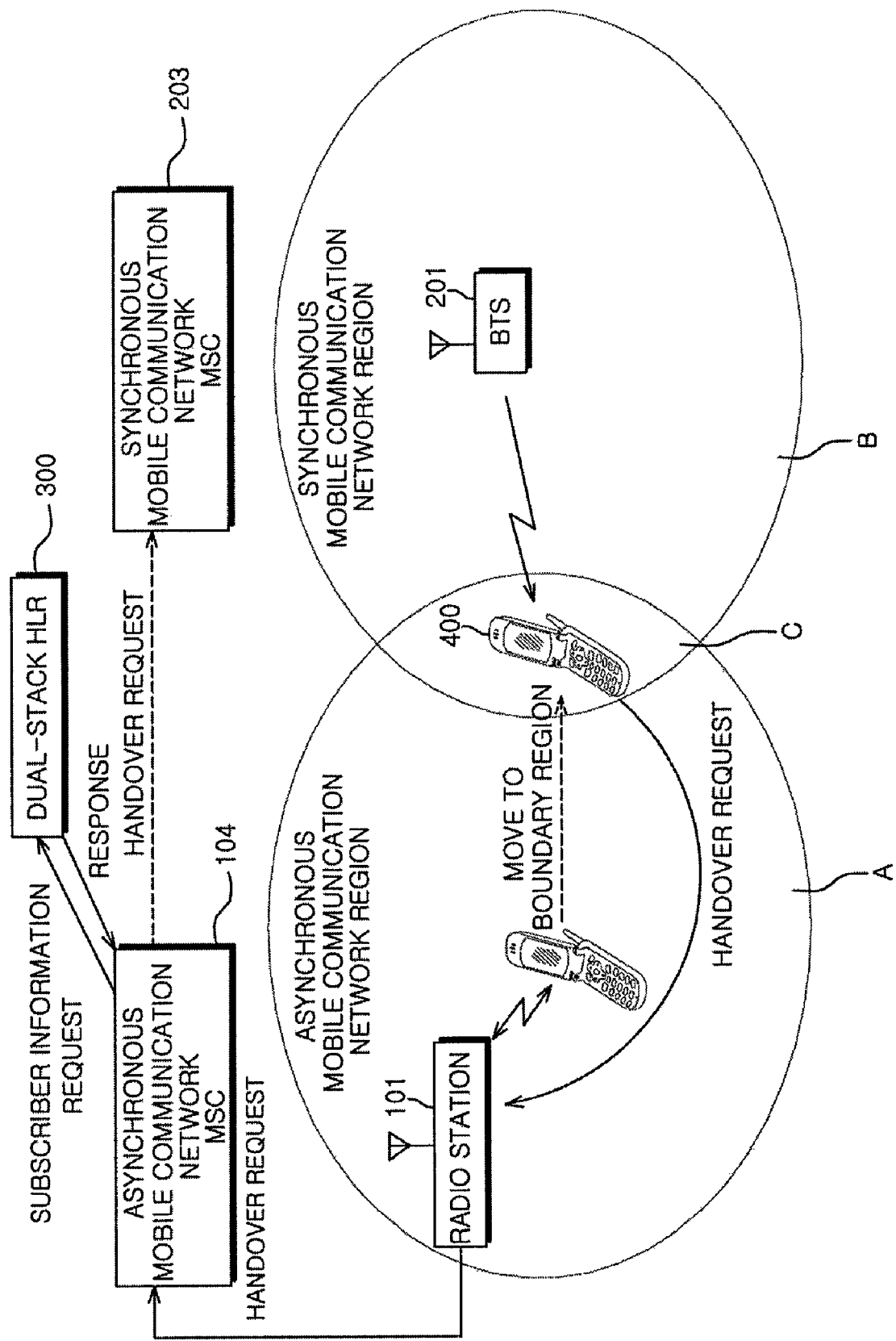
FIG. 4 is a conceptual view showing a handover method according to the present invention.
Figure 5:
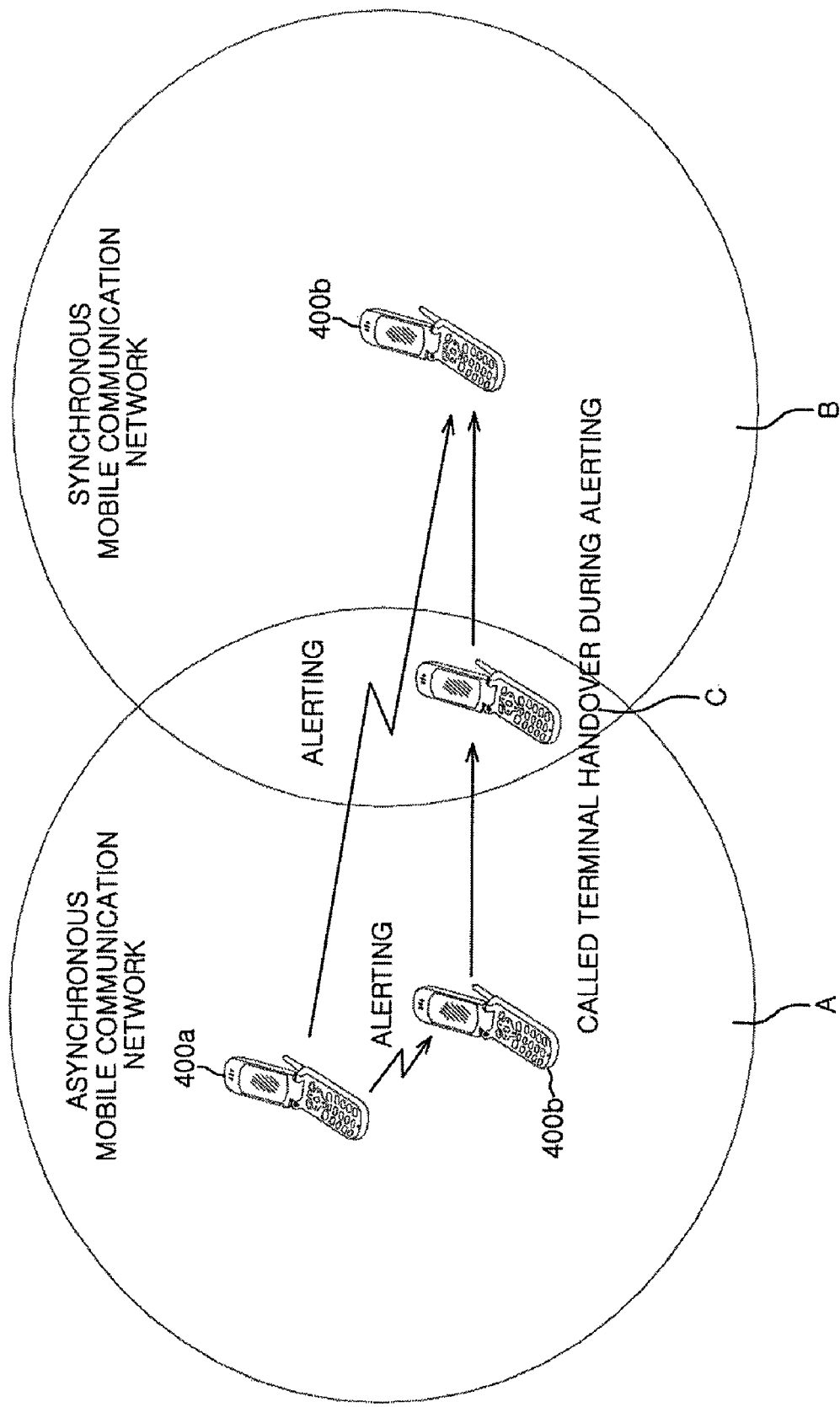
FIG. 5 is a conceptual view showing handover of a mobile communication terminal during alerting according to the present invention.
Figure 6:
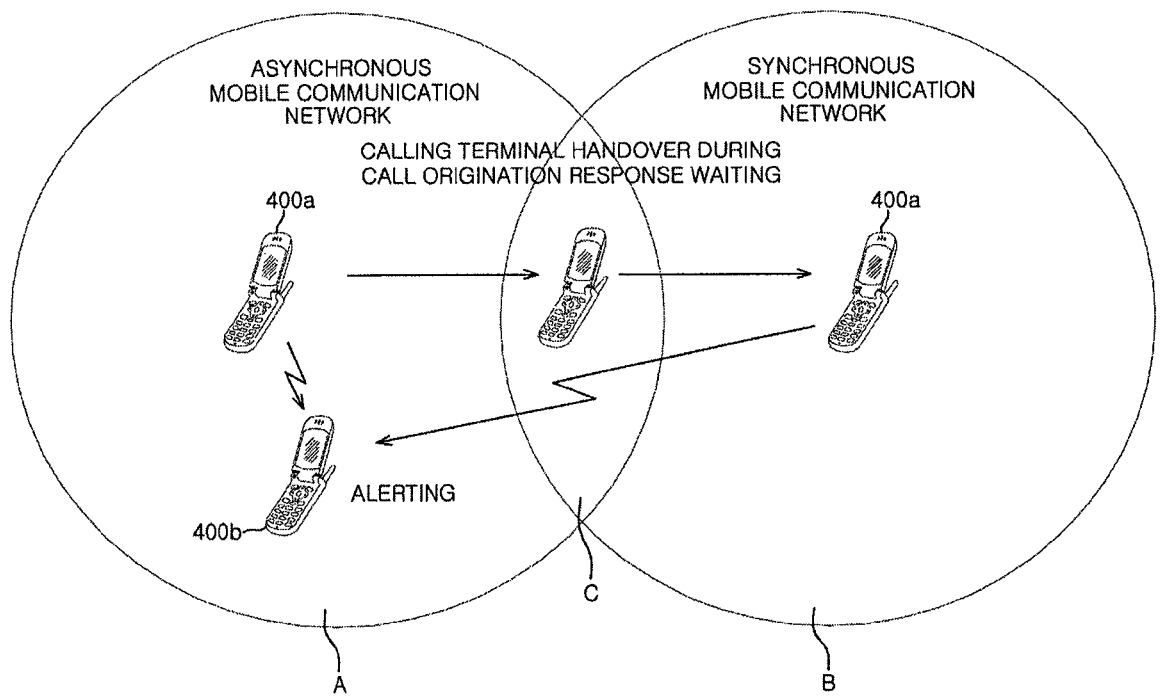
FIG. 6 is a conceptual view showing handover of a mobile communication terminal while waiting for call answering according to the present invention.

FIG. 4 is a conceptual view showing a handover method according to the present invention, FIG. 5 is a conceptual view showing handover of a mobile communication terminal during alerting according to the present invention, and FIG. 6 is a conceptual view showing handover of a mobile communication terminal while waiting for call answering according to the present invention.

Referring to FIG. 4, when a mobile communication terminal 400 moves from the region A of an asynchronous mobile communication network 100 to a boundary region C between the asynchronous and synchronous mobile communication networks during call processing through a radio station, the mobile communication terminal 400 requests handover from the radio station of the asynchronous mobile communication network 100. Accordingly, handover of the mobile communication terminal 400 between the asynchronous and synchronous mobile communication networks 100 and 200 is performed.

That is, the mobile communication terminal 400, situated in the region of the asynchronous mobile communication network 100 and using voice communication, periodically measures the intensity of a signal received from the radio station of the asynchronous mobile communication network and notifies the radio station of the measured signal intensity. If the intensity of the signal from the radio station is decreased to a predetermined threshold value or lower, the radio station notifies the MSC of the asynchronous mobile communication network through the RNC that a handover event is occurring. In this case, an access network (radio station/RNC) transmits adjacent cell information, a BTS ID, etc., detected by the mobile communication terminal 400, to the MSC of the asynchronous mobile communication network, together with the handover event notification.

If a handover request message is received from the RNC, the MSC of the asynchronous mobile communication network determines whether the requested handover is handover between adjacent cells in the asynchronous mobile communication network 100, or handover to the synchronous mobile communication network 200, with reference to the adjacent cell information, the BTS ID, etc., received from the RNC. If it is determined that the requested handover is handover between adjacent cells in the asynchronous mobile communication network 100, the MSC of the asynchronous mobile communication network 100 performs handover to an adjacent cell.

However, if it is determined that the requested handover is handover to the synchronous mobile communication network 200, handover to the MSC of the synchronous mobile communication network 200 is performed. For this operation, the MSC 104 generates a subscriber information request message so as to obtain information about a subscriber to the synchronous mobile communication network of the mobile communication terminal, for which handover will be performed, and transmits the generated subscriber information request message to the dual-stack HLR 300 at step S31, thus requesting the identifier information of the subscriber to the synchronous mobile communication network 200, from the dual-stack HLR 300. As described above, the subscriber information request message may be a synchronous message CallDataRequest, or an asynchronous message MAP SEND IMSI Req using a Mobile Application Part (MAP) message.

As shown in FIG. 13, the synchronous message CallDataRequest includes parameters, such as a billing Identification (ID) or a digit (that is, Mobile Station ISDN Number: MSISDN). As shown in FIG. 14, the asynchronous message includes parameters, such as an invoke ID, MSISDN and International Mobile Subscriber Identity (IMSI), and includes parameters, such as Mobile Identification Number (MIN) and Electronic Serial Number (ESN), which are information used in the synchronous mobile communication network, in an extension container.

The dual-stack HLR 300 receives the above-described asynchronous message or synchronous message, and transmits a response message, including MIN and ESN, to the MSC 104 of the asynchronous mobile communication network 100.

Further, the MSC 104 of the asynchronous mobile communication network 100 must convert the asynchronous message into the synchronous message and transmit the synchronous message to the MSC 203 of the synchronous mobile communication network 200, and, in addition, must arrange the information of the synchronous mobile communication network 200 in a database and manage the information in the database.

In the database, information about MSCs, signal points, dedicated channel-related trunks, etc. is included. In this case, the MSC of the asynchronous mobile communication network selects a handover target MSC based on information about the synchronous mobile communication network, generates a billing ID including the ID of the handover target MSC, generates a handover request message including MIN and ESN included in a response message received from the dual-stack HLR 300, and transmits the handover request message to the corresponding MSC of the synchronous mobile communication network 200, thus performing a handover procedure.

The handover request message has the parameters shown in FIG. 15.

Next, referring to FIG. 5, when a mobile communication terminal 400b that is the called terminal moves from the region A of the asynchronous mobile communication network 100 to a boundary region C between the asynchronous and synchronous mobile communication networks 100 and 200 through a radio station during alerting, the called terminal 400b requests handover from the radio station of the asynchronous mobile communication network 100. Accordingly, handover of the called terminal 400b between the asynchronous and synchronous mobile communication networks 100 and 200 is performed.

Further, with respect to an originating call from an originating terminal 400a, alerting is provided to the called terminal 400b through the BTS of the synchronous mobile communication network.

Referring to FIG. 6, when a mobile communication terminal 400a', the originating terminal, moves from the region A of the asynchronous mobile communication network 100 to a boundary region C between the asynchronous and synchronous mobile communication networks 100 and 200 through a radio station while waiting for call answering, the originating terminal 400a' requests handover from the radio station of the asynchronous mobile communication network 100. Accordingly, handover of the originating terminal 400a' between the asynchronous and synchronous mobile communication networks 100 and 200 is performed.

Further, the waiting of the originating terminal 400a' for a call answering is continuously performed through the BTS of the synchronous mobile communication network.

That is, the originating terminal 400a', that is situated in the region of the asynchronous mobile communication network 100 and is waiting for call answering, periodically measures the intensity of the signal received from the radio station 101, and notifies the radio station 101 of the measured signal intensity, as described above with reference to FIG. 4. If the intensity of the signal from the radio station 101 is decreased to a predetermined threshold value or lower, the radio station 101 notifies the MSC 104 of the asynchronous mobile communication network 100 through the RNC 102 that a handover event is occurring. At this time, an access network (radio station/RNC) transmits adjacent cell information, a BTS ID, etc., detected by the originating terminal 400a', to the MSC 104 of the asynchronous mobile communication network 100, together with the event occurrence notification.

If a handover request message is received from the access network, the MSC 104 of the asynchronous mobile communication network 100 determines whether the requested handover is handover between adjacent cells in the asynchronous mobile communication network 100, or handover to the synchronous mobile communication network 200, with reference to the adjacent cell information, the BTS ID, etc., received from the RNC 102. If requested handover is handover between adjacent cells in the asynchronous mobile communication network 100, the MSC 104 of the asynchronous mobile communication network 100 performs handover to an adjacent cell.

However, in the case of handover to the synchronous mobile communication network 200, a synchronous message CallDataRequest having the parameters of FIG. 13 or an asynchronous message MAP SEND IMSI having the parameters of FIG. 14 is generated so as to acquire subscriber information, and is then transmitted to the dual-stack HLR 300. If a response message is received from the dual-stack HLR 300, a handover target MSC is selected based on the information of the synchronous mobile communication network 200, and a billing ID, including the ID of the handover target MSC, is generated.

Further, the MSC 104 of the asynchronous mobile communication network generates a handover request message FacilitiesDirective2 that includes ESN and MIN information, included in the response message from the dual-stack HLR 300, and the billing ID, including the target handover MSC ID, and transmits the generated handover request message to the synchronous mobile communication network 200.

In this case, the MSC 104 of the asynchronous mobile communication network sets a parameter HandoffState, indicating a handover state in the handover request message, to the handover of a caller.

Meanwhile, the above-described messages and parameters are described later with reference to FIGS. 11 to 17.

Figure 7:
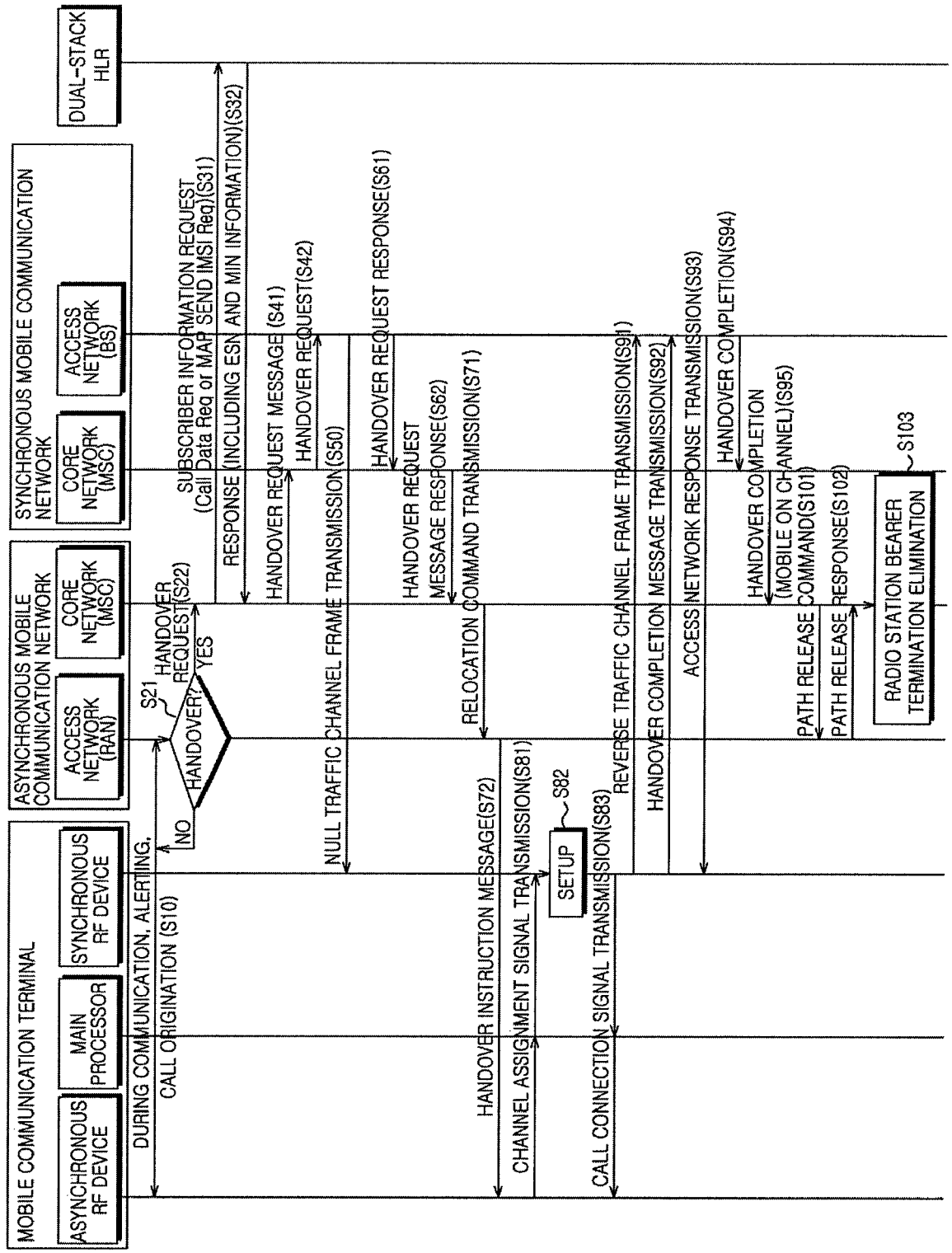
FIG. 7 is a flowchart showing a handover procedure according to the present invention.

FIG. 7 is a flowchart of a handover procedure according to the present invention, which shows the handover procedure described through the conceptual views of FIGS. 4 to 6 in detail.

As shown in the drawing, when the mobile communication terminal 400 is communicating using the asynchronous RF device 420, or is in an alerting state or a call answering waiting state at step S10, the mobile communication terminal 400 detects a signal received from the synchronous mobile communication network 200 as the mobile communication terminal 400 moves from the region of the asynchronous mobile communication network 100 to the region of the synchronous mobile communication network 200.

Accordingly, the mobile communication terminal 400 periodically measures the intensity of the signal received from the radio station 101 of the asynchronous mobile communication network 100 and the intensity of the signal received from an adjacent BTS (or radio station), and notifies the radio station 101 of the measured signal intensity. The access network (radio station and RNC) of the asynchronous mobile communication network 100 determines whether to perform handover of the mobile communication terminal 400 at step S21.

In this case, if the radio station 101 currently connected to the mobile communication terminal 400 determines that the intensity of the signal between the mobile communication terminal 400 and the radio station 101 is equal to or less than a predetermined value, the access network transmits a handover request message IU Reloc Required for handover to the MSC 104 of the asynchronous mobile communication network 100 through the RNC 102 at step S22.

The handover request message IU Reloc Required includes parameters, such as a message type, a handover (relocation) type, the cause of relocation, a source base station controller ID, a target base station controller ID, Radio Access Bearer (RAB), and radio section-related information, as shown in FIG. 11, and includes information used in the synchronous mobile communication network 200, such as the cell information shown in FIG. 12.

The MSC 104 of the asynchronous mobile communication network 100 receives the handover request message IU Reloc Required, and determines whether the requested handover is handover between adjacent cells in the asynchronous mobile communication network 100, or handover to the synchronous mobile communication network 200, based on the information of the received message. If it is determined that the requested handover is handover between adjacent cells in the asynchronous mobile communication network 100, typical handover is performed.

However, if it is determined that the requested handover is handover to the synchronous mobile communication network, the MSC 104, which is the core network of the asynchronous mobile communication network 100, transmits a message, requesting information about a subscriber to the synchronous mobile communication network of the mobile communication terminal, to the dual-stack HLR 300 so as to acquire the information about the subscriber to the synchronous mobile communication network of the mobile communication terminal, for which handover will be performed, at step S31, thus requesting the identifier information of the subscriber to the synchronous mobile communication network 200 from the dual-stack HLR 300.

In this case, the subscriber information request message may be a synchronous message CallDataRequest. As shown in FIG. 13, a synchronous message includes parameters, such as a billing ID or a digit (that is, MSISDN). As shown in FIG. 14, an asynchronous message MAP SEND IMSI Req, using a MAP message, includes asynchronous parameters, such as an invoke ID, MSISDN, or IMSI, and includes synchronous parameters, such as MIN or ESN, in the extension container thereof.

Further, the dual-stack HLR 300 transmits a response message, including ESN and MIN information, which are the identifier information of the corresponding subscriber to the synchronous mobile communication network 200, to the MSC 104 of the asynchronous mobile communication network 100 depending on the subscriber information request at step S32.

Next, the MSC 104 of the asynchronous mobile communication network 100 transmits the handover request message FacilitiesDirective2 for the mobile communication terminal 400, corresponding to the MIN information included in the response message, to the MSC 203, which is the core network of the synchronous mobile communication network 200 at step S41. In this case, the handover request message includes parameters, such as cell information, indicating the BTS information of the synchronous mobile communication network to which handover will be performed, or a billing ID, as shown in FIG. 15.

The MSC 203 of the synchronous mobile communication network 200 transmits a handover request message to the access network (BTS and BSC) of the synchronous mobile communication network 200 in response to the handover request message at step S42.

The access network of the synchronous mobile communication network transmits a null traffic channel frame to the synchronous RF device 430 of the mobile communication terminal 400, corresponding to the MIN, through a Forward Fundamental Channel (F-FCH) required for forward traffic transmission at step S50. The access network (BTS/BSC) transmits a handover request response message to the MSC 203 at step S61. Accordingly, a forward channel is assigned to the synchronous RF device 430 of the mobile communication terminal 400.

As described above, if preparation for handover has been completed in the synchronous mobile communication network 200, the MSC 203 of the synchronous mobile communication network 200 transmits a response signal to the request message at step S41, that is, a handover request message response FacilitiesDirective2 Ack, to the asynchronous mobile communication network 100 at step S62. Accordingly, a trunk between the MSC 104 of the asynchronous mobile communication network 100 and the MSC 203 of the synchronous mobile communication network 200 is established.

In detail, the MSC 104 of the asynchronous mobile communication network 100 sets a mapping relationship between a dedicated channel, which is a logical trunk establishment identifier, and a physical trunk sets the mapping information to the internal MSC circuit ID InterMSCCircuitID of the handover request message FacilitiesDirective2, and transmits the internal MSC circuit ID to the MSC 203 of the synchronous mobile communication network 200. If the response message FacilitiesDirective2 Ack at step S62 has been transmitted from the MSC 203 of the synchronous mobile communication network 200, the trunk between the MSC 104 of the asynchronous mobile communication network 100 and the MSC 203 of the synchronous mobile communication network 200 is established. The response message FacilitiesDirective2 Ack at step S62 includes parameters, such as CDMA channel data or CDMA channel lists.

Thereafter, the MSC 104 of the asynchronous mobile communication network 100 transmits a relocation command (IU Relocation Command), indicating that the allocation of resources for handover has been completed, to the access network (radio station/RNC) at step S71. In this case, the relocation command includes the parameters shown in FIG. 16.

In response to the relocation command at step S71, the access network (radio station/RNC) transmits a handover instruction message (Handover from UTRAN Command) to the asynchronous RF device 420 of the mobile communication terminal 400 at step S72. In this case, the handover instruction message includes a message related to the synchronous mobile communication network, in particular, a Handoff Direction Message (HDM) having information for channel assignment.

Next, the asynchronous RF device 420 requests channel assignment from the main processor 443 in response to the handover instruction message at step S72, and the main processor 443 performs channel assignment for the synchronous RF device 430 (channel assignment) at step S81.

Accordingly, the synchronous modem unit 434 of the synchronous RF device 430 performs a setup operation at step S82. In the setup operation, the synchronous modem unit 434 is activated through switch-on and warm-up operations, performs synchronization with the access network (BTS/BSC) of the synchronous mobile communication network 200 through acquisition of a pilot channel and a synchronization channel, and receives timing information or other system information from the access network (BTS/BSC) through the acquisition of the synchronization channel.

Further, the synchronous RF device 430 transmits a call connection signal to the asynchronous RF device 420 through the main processor 443 (call connected) at step S83. Accordingly, the mode switching of the mobile communication terminal 400 between the asynchronous RF device 420 and the synchronous RF device 430 is completed.

Further, the synchronous RF device 430 transmits traffic channel frames (R-FCH frames) to the access network (BTS/BSC) of the synchronous mobile communication network 200 through a reverse fundamental channel (R-FCH) at step S91, so that the mobile communication terminal 400 realizes reverse synchronization with the synchronous mobile communication network. Accordingly, the connection between the mobile communication terminal 400 and the synchronous mobile communication network 200 is made. The synchronous RF device 430 of the mobile communication terminal 400 transmits a handover completion message to the access network of the synchronous mobile communication network 200 at step S92. Further, the access network (BTS/BSC), having received the handover completion message, transmits a response signal to the handover completion message to the synchronous RF device 430 (BS Ack Order) at step S93.

Thereafter, the access network (BTS/BSC) of the synchronous mobile communication network 200 notifies the MSC 203 of the completion of handover (Handover Complete) at step S94. The MSC 203 of the synchronous mobile communication network 200 notifies the core network of the asynchronous mobile communication network 100 of the completion of handover (Mobile On Channel) at step S95. Further, the asynchronous mobile communication network 100 switches the bearer termination of the radio station and the bearer termination of the synchronous mobile communication network to a one way mode depending on the handover completion notification.

Next the MSC 104 of the asynchronous mobile communication network 100 requests the radio station/RNC to release the path to the asynchronous RF device 420 of the mobile communication terminal 400 (Iu Release Command) at step S101. The asynchronous mobile communication network 100 releases a call with the asynchronous RF device 420, and notifies the core network that the release of the call has been completed (IU Release Complete) at step S102.

Thereafter, the asynchronous mobile communication network 100 eliminates the bearer termination of the radio station of the access network at step S103. Accordingly, handover of the mobile communication terminal 400 from the asynchronous mobile communication network 100 to the synchronous mobile communication network 200, performed during call processing, alerting, or waiting for call answering, is completed.

In some embodiments, the MSC of the asynchronous mobile communication network continuously transmits a ringback tone to the originating terminal even during handover of the called terminal.

Figure 8:
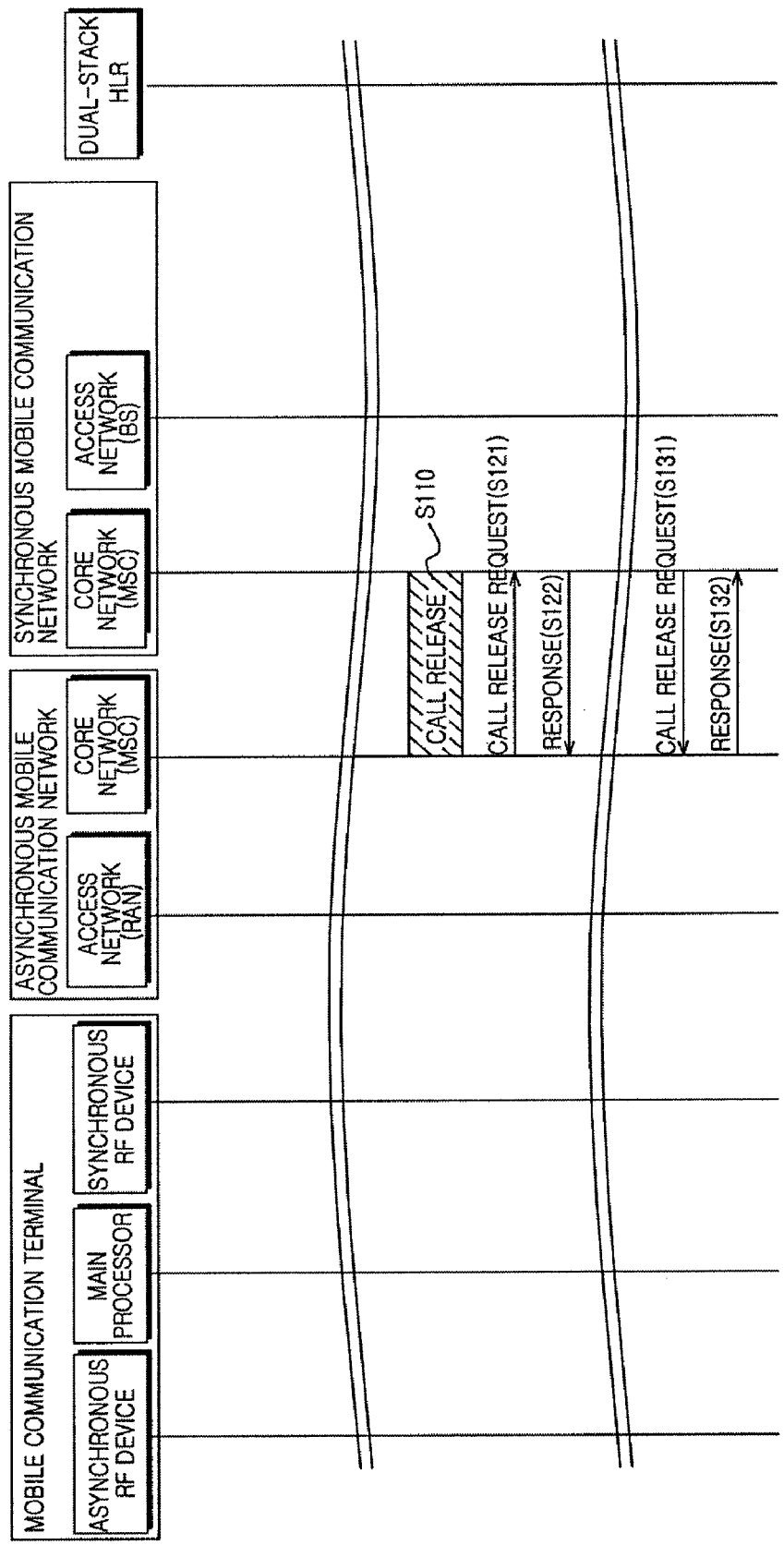
FIG. 8 is a flowchart showing a call release procedure performed after the handover procedure according to the present invention.
Figure 9:
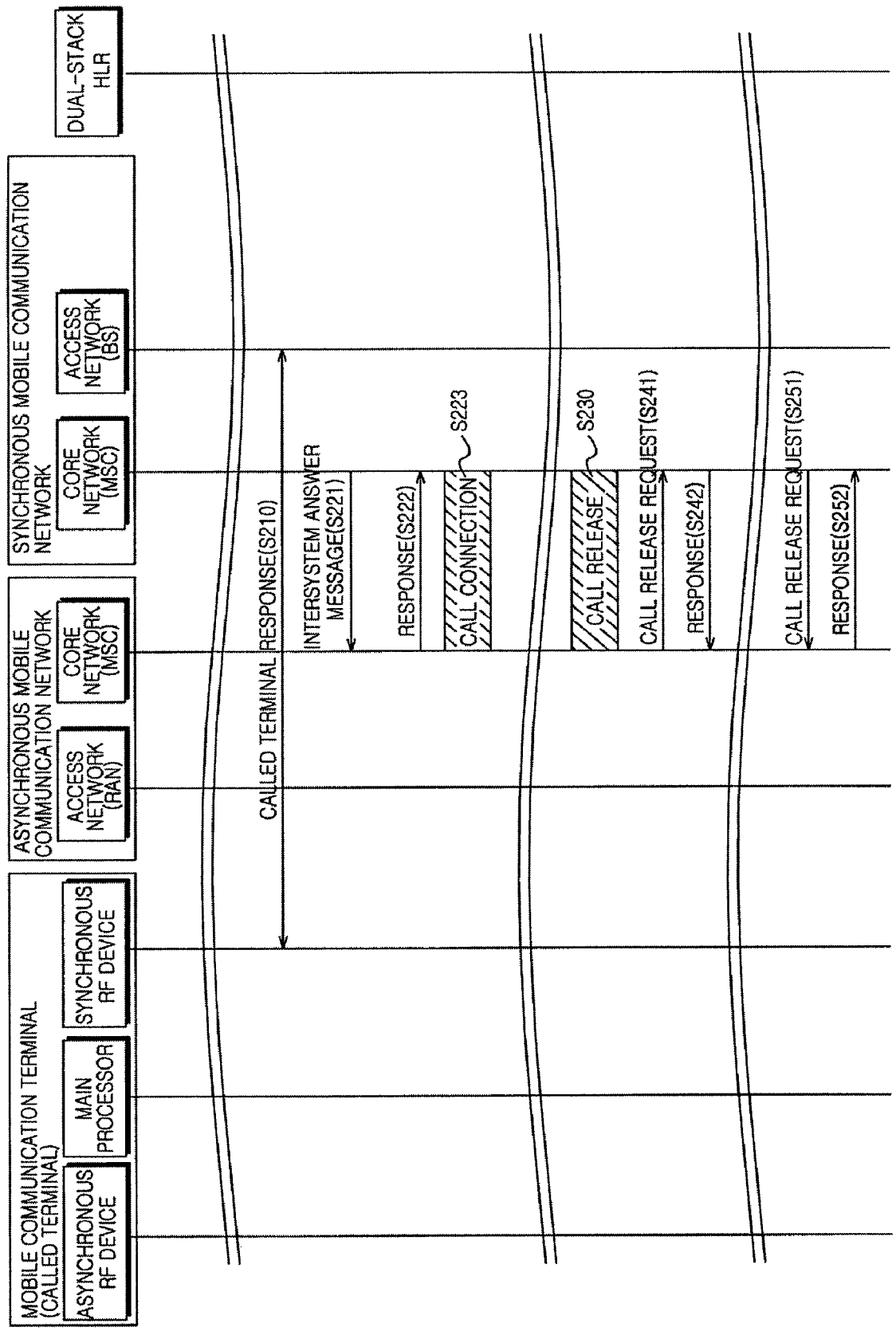
FIG. 9 is a flowchart showing a call connection/release procedure after a handover procedure performed during alerting according to the present invention.
Figure 10:
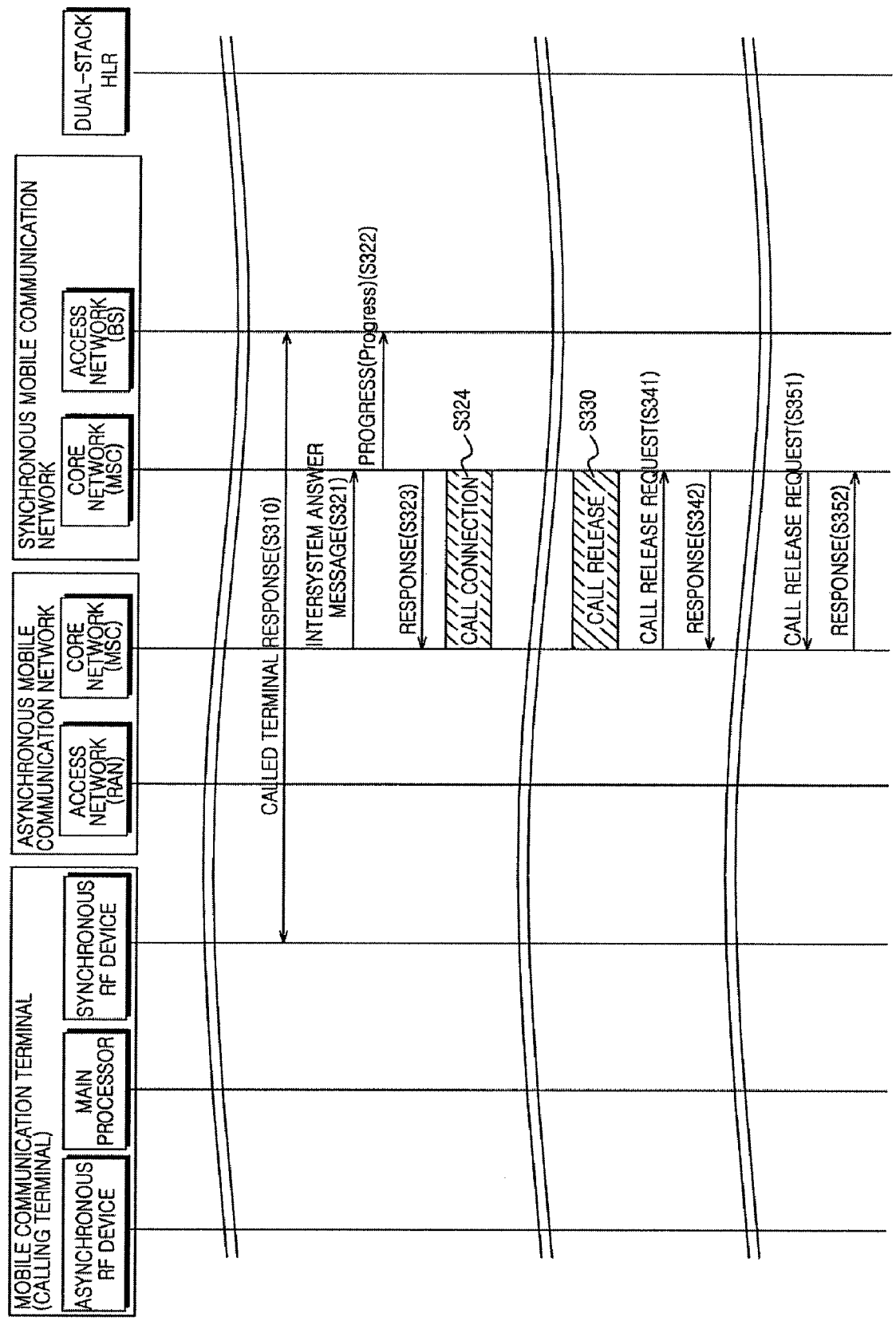
FIG. 10 is a flowchart showing a call connection/release procedure after a handover performed while waiting for call answering according to the present invention.

Next, procedures performed after the completion of handover are described according to each embodiment, with reference to FIGS. 8 to 10.

FIG. 8 is a flowchart of a call release procedure performed after a handover procedure according to the present invention, which shows that, if either one of a called terminal and an originating terminal releases a call after handover has been completed, the following procedure is performed.

As shown in the drawing, if a mobile communication terminal, situated in the region of the asynchronous mobile communication network 100, releases a call at step S110, the asynchronous mobile communication network 100 transmits a call release request message Facilities Release to the synchronous mobile communication network 200 at step S121. The synchronous mobile communication network 200 transmits a response message Facilities Ack to the call release request message to the asynchronous mobile communication network 100 at step S122, and then completely releases the call with the mobile communication terminal situated in the region of the synchronous mobile communication network 200.

However, if the mobile communication terminal, situated in the region of the synchronous mobile communication network 200, releases the call, the synchronous mobile communication network 200 transmits a call release request message Facilities Release to the asynchronous mobile communication network 100 at step S131. The asynchronous mobile communication network 100 transmits a response message Facilities Ack to the call release request message to the synchronous mobile communication network 200 at step S132, and then completely releases the call with the mobile communication terminal situated in the region of the asynchronous mobile communication network 100.

As shown in FIG. 17, the call release request message Facilities Release includes parameters, such as a billing ID, a digit, or an MSCID, and the response message Facilities Ack includes parameters, such as an ESN or a MIN.

Next, FIG. 9 is a flowchart showing a call connection/release procedure after a handover procedure performed during alerting according to the present invention.

If the mobile communication terminal 400, situated in the region of the synchronous mobile communication network 200 after handover has been completed, makes a response at step S210, the MSC of the synchronous mobile communication network transmits an intersystem answer message InterSystemAnswer to the asynchronous mobile communication network 100 at step S221. In this case, the asynchronous mobile communication network 100, having received the intersystem answer message, transmits a predetermined ISDN User Part (ISUP) answer message to the initial system that originated the call. Further, the asynchronous mobile communication network 100 transmits a response to the message at step S221 to the synchronous mobile communication network 200 at step S222. Therefore, a call between the mobile communication terminal 400, which is the called terminal situated in the synchronous mobile communication network 200, and the asynchronous mobile communication network 100, in which the originating terminal is situated, is connected at step S223.

If either one of the called terminal and the originating terminal releases a call during call processing after call connection at step S230, the following procedure is performed.

If the originating terminal, situated in the region of the asynchronous mobile communication network 100, releases the call, the asynchronous mobile communication network 100 transmits a call release request message Facilities Release to the synchronous mobile communication network 200 at step S241. The synchronous mobile communication network 200 transmits a response message Facilities Ack to the call release request message to the asynchronous mobile communication network 100 at step S242, and completely releases the call with the mobile communication terminal 400, which is the called terminal.

However, if the called terminal 400, situated in the synchronous mobile communication network 200, releases the call, the synchronous mobile communication network 200 transmits a call release request message Facilities Release to the asynchronous mobile communication network 100 at step S251. The asynchronous mobile communication network 100 transmits a response message Facilities Ack to the call release request message to the synchronous mobile communication network 200 at step S252, and completely releases the call with the originating terminal.

FIG. 10 is a flowchart showing a call connection/release procedure after a handover procedure performed while waiting for call answering according to the present invention.

If the called terminal, situated in the region of the asynchronous mobile communication network 100, makes a response after handover has been completed at step S310, the MSC 104 of the asynchronous mobile communication network 100 transmits an intersystem answer message InterSystemAnswer to the synchronous mobile communication network 200, to which handover is performed for the originating terminal, in response to a message received from a called party system (a Bearer-Independent Call Control [BICC] message, which is an asynchronous message, or an ISUP answer message, which is a synchronous message) at step S321.

Accordingly, the MSC 203 of the synchronous mobile communication network 200 transmits a message Progress, indicating the progress of a call, to the access network at step S322, and transmits a response message InterSystemAnswer Ack to the message at step S321 to the asynchronous mobile communication network 100 at step S323. Therefore, a call between the mobile communication terminal, which is moved to the region of the synchronous mobile communication network 200, and a called party is connected at step S324.

If either one of the called terminal and the originating terminal releases a call during call processing after call connection at step S330, the following procedure is performed.

If the mobile communication terminal, situated in the region of the asynchronous mobile communication network 100, releases the call, the asynchronous mobile communication network 100 transmits a call release request message Facilities Release to the synchronous mobile communication network 200 at step S341. The synchronous mobile communication network 200 transmits a response message Facilities Ack to the call release request message to the asynchronous mobile communication network 100 at step S342, and then completely releases the call with the mobile communication terminal 400 that is situated in the region of the synchronous mobile communication network 200.

However, if the mobile communication terminal, situated in the region of the synchronous mobile communication network 200, releases the call, the synchronous mobile communication network 200 transmits a call release request message Facilities Release to the asynchronous mobile communication network 100 at step S351. The asynchronous mobile communication network 100 transmits a response message Facilities Ack to the call release request message to the synchronous mobile communication network 200 at step S352, and then completely releases the call with the mobile communication terminal that is situated in the region of the asynchronous mobile communication network 100.

Meanwhile, steps S330 to S342 and steps S351 and S352 are the same as those of the embodiment of FIG. 9.

In the above-described present invention, those skilled in the art will appreciate that the present invention can be implemented in other detailed forms without changing the technical spirit or essential features of the invention. Therefore, it should be understood that the above embodiments are only exemplary, but are not limited. The scope of the present invention is defined by the accompanying claims rather than the detailed description. All changes or modifications that can be derived from the meaning and scope of the claims and equivalent concepts thereof should be interpreted as being included in the scope of the present invention.

INDUSTRIAL APPLICABILITY

As described above, a method of performing handover from an asynchronous mobile communication network to a synchronous mobile communication network according to the present invention is advantageous in that, when a mobile communication terminal moves from the region of an asynchronous mobile communication network to the region of a synchronous mobile communication network during call processing, in a mobile communication network in which asynchronous and synchronous mobile communication systems coexist, handover can be smoothly performed, so that a service can be provided without causing call interruption. In particular, the present invention is advantageous in that, when a called terminal moves, during alerting, or an originating terminal moves, while waiting for call answering, from the region of the asynchronous mobile communication network to the region of the synchronous mobile communication network, handover can be smoothly performed without causing call interruption, thus improving a call connection rate.

The invention claimed is:

1. A method of performing handover from an asynchronous mobile communication network to a synchronous mobile communication network, in which the asynchronous mobile communication network and the synchronous mobile communication network coexist for a dual-band/dual mode mobile communication terminal, and which includes a dual-stack Home Location Register (HLR) required to manage information about subscribers to the asynchronous and synchronous mobile communication networks, the mobile communication terminal including an asynchronous Radio Frequency (RF) device for performing asynchronous communication with the asynchronous mobile communication network, a synchronous RF device for performing synchronous communication with the synchronous mobile communication network, and a common module for controlling wireless communicating with the synchronous/asynchronous mobile communication networks through the synchronous and asynchronous RF devices, the method comprising:
a first step of an access network of the asynchronous mobile communication network requesting handover to a Mobile Switching Center (MSC) of the asynchronous mobile communication network in response to a handover request from the mobile communication terminal;
a second step of the MSC of the asynchronous mobile communication network determining whether the requested handover is handover to the synchronous mobile communication network in response to the handover request, requesting subscriber information of the mobile communication terminal from the dual-stack HLR, and receiving the subscriber information from the dual-stack HLR if it is determined that the requested handover is handover to the synchronous mobile communication network;
a third step of transmitting a handover request message to the synchronous mobile communication network, based on the subscriber information of the mobile communication terminal received at the second step;
a fourth step of an MSC of the synchronous mobile communication network assigning a forward channel to the mobile communication terminal, based on the subscriber information;
a fifth step of, if the MSC of the synchronous mobile communication network transmits a response message to the asynchronous mobile communication network after channel assignment has been performed at the fourth step, the asynchronous mobile communication network transmitting a handover instruction message to the asynchronous RF device of the mobile communication terminal;
a sixth step of the mobile communication terminal setting up the synchronous RF device in response to the handover instruction message, connecting to the synchronous mobile communication network through assignment of a reverse channel and achievement of synchronization, and transmitting a handover completion message to the synchronous mobile communication network;
a seventh step of the synchronous mobile communication network transmitting a handover completion message to the asynchronous mobile communication network in response to the handover completion message at the sixth step; and
an eighth step of the MSC of the asynchronous mobile communication network transmitting a path release command to the access network in response to the handover completion message from the synchronous mobile communication network, and receiving a response from the access network, thus releasing a path between the asynchronous mobile communication network and the asynchronous RF device of the mobile communication terminal.

2. The handover method according to claim 1, wherein, at the first step, a message for requesting handover comprises a handover-related message used in the synchronous mobile communication network, and parameters, such as information about adjacent cells of the mobile communication terminal information about adjacent Base Transceiver Stations (BTSs), a handover type, a cause of handover, a source base station controller ID, a target base station controller ID, information about a Radio Access Bearer (RAB), or radio section-related information.

3. The handover method according to claim 1, wherein, at the second step, the message requesting subscriber information of the mobile communication terminal from the dual-stack HLR is a synchronous Mobile Application Part (MAP) message, and comprises parameters, such as a billing ID or a Mobile Station Integrated Services Digital Network number (MSISDN).

4. The handover method according to claim 1, wherein, at the second step, the message requesting subscriber information of the mobile communication terminal from the dual-stack HLR is an asynchronous message using a MAP message, and comprises parameters, such as an invoke ID, an MSISDN, or an International Mobile Subscriber Identity (IMSI), and also comprises parameters, such as a Mobile Identification Number (MIN) or an Electronic Serial Number (ESN), in an extension container.

5. The handover method according to claim 1, wherein, at the second step, the dual-stack HLR transmits a response message, including ESN and MIN information of the mobile communication terminal for the synchronous mobile communication network, to the asynchronous mobile communication network in response to the message requesting subscriber information.

6. The handover method according to claim 1, wherein, at the third step, the handover request message comprises parameters, such as a billing ID, an ESN, an internal MSC circuit ID, or a MIN.

7. The handover method according to claim 1, wherein, at the third step, the handover request message comprises a billing ID, including information about an ID of the MSC of the synchronous mobile communication network to be connected to the MSC of the asynchronous mobile communication network, and an internal MSC circuit ID (InterMSCCircuitID) for each handover section.

8. The handover method according to claim 1, wherein, at the fourth step, a Base Transceiver Station (BTS) of the synchronous mobile communication network performs assignment of a forward channel by transmitting a null traffic channel frame to the synchronous RF device of the mobile communication terminal.

9. The handover method according to claim 1, wherein, at the fifth step, the handover instruction message, transmitted to the asynchronous RF device of the mobile communication terminal, comprises parameters including a message type, a Radio Resource Control (RRC) container, and a list of Radio Access Bearers (RABs) to be released, and information required for channel assignment related to the synchronous mobile communication network.

10. The handover method according to claim 1, wherein, at the sixth step, the setup is implemented by performing the steps of:
the asynchronous RF device of the mobile communication terminal transmitting channel assignment information to the synchronous RF device in response to the handover instruction message; and
performing mode switching between the asynchronous RF device and the synchronous RF device.

11. The handover method according to claim 1, wherein, at the sixth step, connection is performed between the synchronous RF device and the synchronous mobile communication network through assignment of a reverse channel and achievement of synchronization after setup has been performed.

12. The handover method according to claim 1, wherein, at the eighth step, the path release command comprises parameters, including a billing ID, a digit, or a mobile switching center ID (MSCID).

13. A method of performing handover from an asynchronous mobile communication network to a synchronous mobile communication network, in which the asynchronous mobile communication network and the synchronous mobile communication network coexist for a dual-band/dual mode mobile communication terminal, and which includes a dual-stack Home Location Register (HLR) required to manage information about subscribers to the asynchronous and synchronous mobile communication networks, the mobile communication terminal including an asynchronous Radio Frequency (RF) device for performing asynchronous communication with the asynchronous mobile communication network, a synchronous RF device for performing synchronous communication with the synchronous mobile communication network, and a common module for controlling wireless communicating with the synchronous/asynchronous mobile communication networks through the synchronous and asynchronous RF devices, the method comprising:
a first step of the asynchronous mobile communication network requesting/receiving information about the mobile communication terminal, which is a called terminal located in a region of the asynchronous mobile communication network, from the dual-stack HLR, if the called terminal enters the synchronous mobile communication network during alerting;
a second step of requesting handover to the synchronous mobile communication network in response to information about the called terminal received at the first step;
a third step of the synchronous mobile communication network assigning a forward channel to the called terminal in response to information at the second step;
a fourth step of, if the synchronous mobile communication network transmits a response message to the asynchronous mobile communication network after channel assignment has been performed at the third step, the asynchronous mobile communication network transmitting a handover instruction message to the asynchronous RF device of the called terminal;
a fifth step of the called terminal setting up the synchronous RF device in response to the handover instruction message, connecting to the synchronous mobile communication network through assignment of a reverse channel and achievement of synchronization, and maintaining the alerting;
a sixth step of releasing a path between the asynchronous mobile communication network and the asynchronous RF device of the called terminal in response to a handover completion message received from the synchronous mobile communication network after the connection has been performed; and
a seventh step of, if the called terminal responds to the alerting, the synchronous mobile communication network connecting the call.

14. The handover method according to claim 13, wherein the first step comprises the steps of:
as the mobile communication terminal, which is the called terminal located in a region of the asynchronous mobile communication network, enters the synchronous mobile communication network during alerting, the access network of the asynchronous mobile communication network transmitting a relocation request message to a core network, and
the core network of the asynchronous mobile communication network transmitting a message, requesting information of the mobile communication terminal, for which handover will be performed, in the synchronous mobile communication network, to the dual-stack HLR using a Mobile Application Part (MAP) message in response to the relocation request message, and receiving a response message from the dual-stack HLR.

15. The handover method according to claim 14, wherein the relocation request message comprises cell information, which is information about a Base Transceiver Station (BTS) of the synchronous mobile communication network that will perform handover.

16. The handover method according to claim 14, wherein the dual-stack HLR includes ESN and MIN information of the called terminal for the synchronous mobile communication network in the response message in response to the MAP message, and transmits the response message to the asynchronous mobile communication network.

17. The handover method according to claim 13, wherein, at the third step, the BTS of the synchronous mobile communication network performs assignment of a forward channel by transmitting a null traffic channel frame to the synchronous RF device of the mobile communication terminal.

18. The handover method according to claim 13, wherein, at the fifth step, the setup procedure comprises the steps of:
the asynchronous mobile communication network transmitting a handover instruction message, including channel assignment information, to the asynchronous RF device of the mobile communication terminal;
the asynchronous RF device of the mobile communication terminal transmitting channel assignment information to the synchronous RF device; and
performing mode switching between the asynchronous RF device and the synchronous RF device.

19. The handover method according to claim 18, wherein the fifth step comprises the steps of:
performing connection between the synchronous RF device and the synchronous mobile communication network through assignment of a reverse channel and achievement of synchronization after the setup procedure has been completed; and
the synchronous mobile communication network maintaining alerting using the synchronous RF device of the called terminal.

20. The handover method according to claim 13, wherein, at the sixth step, the asynchronous mobile communication network eliminates bearer termination of the radio station of the access network for the asynchronous RF device of the called terminal as the path is released.

21. The handover method according to claim 13, wherein, at the sixth step, the asynchronous mobile communication network switches bearer termination of the radio station and bearer termination of the synchronous mobile communication network to a one way mode in response to the handover completion message from the synchronous mobile communication network.

22. The handover method according to claim 13, wherein, at the seventh step, as the called terminal responds to alerting, the synchronous mobile communication network transmits an intersystem answer message to the asynchronous mobile communication network, and receives a response to the intersystem answer message, thus connecting a call between the called terminal and the originating terminal located in a region of the asynchronous mobile communication network.

23. The handover method according to claim 22, wherein the MSC of the asynchronous mobile communication network receives the intersystem answer message, and transmits a response message, received from the called terminal, to a mobile communication network including the originating terminal, thus performing call connection.

24. The handover method according to claim 13, wherein the MSC of the asynchronous mobile communication network continuously transmits a ringback tone to the originating terminal even during handover of the called terminal.

25. A method of performing handover from an asynchronous mobile communication network to a synchronous mobile communication network, in which the asynchronous mobile communication network and the synchronous mobile communication network coexist for a dual-band/dual mode mobile communication terminal, and which includes a dual-stack Home Location Register (HLR) required to manage information about subscribers to the asynchronous and synchronous mobile communication networks, the mobile communication terminal including an asynchronous Radio Frequency (RF) device for performing asynchronous communication with the asynchronous mobile communication network, a synchronous RF device for performing synchronous communication with the synchronous mobile communication network, and a common module for controlling wireless communicating with the synchronous/asynchronous mobile communication networks through the synchronous and asynchronous RF devices, the method comprising:
a first step of an access network of the asynchronous mobile communication network requesting handover to a core network as the mobile communication terminal, which is an originating terminal located in a region of the asynchronous mobile communication network, enters the synchronous mobile communication network while waiting for call answering;
a second step of the core network of the asynchronous mobile communication network transmitting a message, requesting information about a subscriber to the synchronous mobile communication network of the originating terminal, for which handover is to be performed, to the dual-stack HLR in response to the handover request, and receiving a response from the dual-stack HLR;
a third step of the MSC of the asynchronous mobile communication network generating a handover request message, based on the information of the originating terminal received at the second step, and requesting handover to the synchronous mobile communication network,
a fourth step of the synchronous mobile communication network assigning a forward channel to the originating terminal based on the information at the third step;
a fifth step of, if the synchronous mobile communication network transmits a response message to the asynchronous mobile communication network after channel assignment has been performed at the fourth step, the asynchronous mobile communication network transmitting a handover instruction message to the asynchronous RF device of the originating terminal;
a sixth step of the originating terminal, which is waiting for call answering, setting up the synchronous RF device in response to the handover instruction message, connecting to the synchronous mobile communication network through assignment of a reverse channel and achievement of synchronization, and continuing to wait for call answering; and
a seventh step of releasing a path between the asynchronous mobile communication network and the asynchronous RF device of the originating terminal that is waiting for call answering, in response to a handover completion message received from the synchronous mobile communication network after the connection has been performed, thus completing handover of the originating terminal.

26. The handover method according to claim 25, wherein, at the first step, a message for requesting handover comprises cell information, which is information about a Base Transceiver Station (BTS) of the synchronous mobile communication network that will perform handover.

27. The handover method according to claim 25, wherein, at the second step, the message requesting subscriber information of the mobile communication terminal from the dual-stack HLR is a synchronous MAP message, and comprises parameters, such as a billing ID, or a Mobile Station Integrated Services Digital Network number (MSISDN).

28. The handover method according to claim 25, wherein, at the second step, the message requesting subscriber information of the mobile communication terminal from the dual-stack HLR is an asynchronous message using a MAP message, and comprises parameters, such as an invoke ID, an MSISDN, an International Mobile Subscriber Identity (IMSI), a Mobile Identification Number (MIN) or an Electronic Serial Number (ESN).

29. The handover method according to claim 25, wherein, at the second step, the dual-stack HLR transmits a response message, including ESN and MIN information of the mobile communication terminal for the synchronous mobile communication network, to the asynchronous mobile communication network in response to the subscriber information request message.

30. The handover method according to claim 25, wherein, at the fourth step, the BTS of the synchronous mobile communication network performs assignment of a forward channel by transmitting a null traffic channel frame to the synchronous RF device of the mobile communication terminal, which is the originating terminal.

31. The handover method according to claim 25, wherein, at the sixth step, the setup procedure comprises the steps of:
the asynchronous mobile communication network transmitting a handover request message, including channel assignment information, to the asynchronous RF device of the mobile communication terminal, which is the originating terminal;
the asynchronous RF device of the mobile communication terminal, which is the originating terminal, transmitting channel assignment information to the synchronous RF device; and
performing mode switching between the asynchronous RF device and the synchronous RF device.

32. The handover method according to claim 31, wherein:
the sixth step comprises the step of performing connection between the synchronous RF device and the synchronous mobile communication network through assignment of a reverse channel and achievement of synchronization after the setup procedure has been performed, and
the synchronous RF device of the originating terminal continues to wait for the call answering over the synchronous mobile communication network.

33. The handover method according to claim 25, wherein, at the seventh step, the asynchronous mobile communication network eliminates bearer termination of the ratio station of the access network for the asynchronous RF device of the called terminal in response to the release of the path.

34. The handover method according to claim 25, wherein, at the seventh step, the asynchronous mobile communication network switches bearer termination of the radio station and bearer termination of the synchronous mobile communication network to a one way mode in response to a handover completion message received from the synchronous mobile communication network.

35. The handover method according to claim 25, further comprising the steps of:
the asynchronous mobile communication network transmitting an intersystem answer message to the synchronous mobile communication network as the called terminal responds to call origination from the originating terminal; and
the synchronous mobile communication network transmitting a call progress command for the originating terminal to the access network in response to the intersystem answer message, and transmitting a response to the intersystem answer message to the asynchronous mobile communication network, thus connecting a call between the originating terminal, located in a region of the synchronous mobile communication network, and the called terminal.

\* \* \* \* \*